United States Patent [19]

Houston

[11] 4,288,285
[45] Sep. 8, 1981

[54] APPARATUS FOR FORMING A VORTEX

[75] Inventor: James E. Houston, Grand Island, N.Y.

[73] Assignee: Evaporator Technology Corporation, Buffalo, N.Y.

[21] Appl. No.: 173,141

[22] Filed: Jul. 28, 1980

[51] Int. Cl.³ .............................................. B01D 9/02
[52] U.S. Cl. .................. 159/1 C; 159/27 D; 159/45; 422/245; 165/104.31
[58] Field of Search .................. 159/1 C, 27 R, 27 A, 159/27 D, 45; 165/107, 109; 23/273 R, 273 F; 422/245

[56] References Cited

U.S. PATENT DOCUMENTS

| 898,147 | 9/1908 | Von Seemen | 159/45 |
| 3,056,831 | 10/1962 | Stratford | 159/1 C |
| 3,292,999 | 12/1966 | Chirico | 159/45 |

Primary Examiner—Norman Yudkoff
Attorney, Agent, or Firm—Sommer & Sommer

[57] ABSTRACT

Apparatus for forming a vortex includes inner and outer wall structures. The inner wall has a downward flow passageway therewithin. A plurality of vanes are provided between the wall structures to induce a vortex to form from an upward flow of liquor through the annular passageway between the walls. The wall structures form a settling trough into which solid materials may settle and accumulate.

9 Claims, 6 Drawing Figures

APPARATUS FOR FORMING A VORTEX

BACKGROUND OF THE INVENTION

1. Field of the Invention

The present invention relates generally to an apparatus for forming a vortex, and more particularly to a vortex-forming device which may be employed in an evaporator or concentrator.

2. Description of the Prior Art

Evaporators and crystallizers are devices for concentrating a fluid component. Heretofore, it has been known to provide a forced-circulating evaporator having an uppermost vapor body, an intermediate steamchest, and a lowermost circulation chamber. The steamchest had a plurality of tubes which were effectively divided into an inner group, which directed the flow upwardly, and an outer annular group, in which the flow was downward. Liquor in the evaporator was circulated by means of a pump in the circulation chamber. Such pump was operated in such a manner as to cause the heated liquor to circulate upwardly through the steamchest inner tubes to the vapor body, where vapors thereof were removed, and downwardly through the tubes of the outer annular group.

However, as the liquor began to concentrate, crystals, which would typically form on the walls of the vapor body, would tend to break off, and be carried downwardly with the circulation of the liquor to clog or obstruct the mouths of the tubes of the outer group. This required frequent process interruption, during which such crystals were removed by flushing with an appropriate dilutent.

Structural and operational details of such concentrators may be found in one or more of U.S. Pat. Nos. 3,976,430; 4,113,552; 3,165,435; 2,946,401; and 1,004,087.

SUMMARY OF THE INVENTION

The present invention provides apparatus for forming a vortex, which is particularly useful in an evaporator or crystallizer.

The improved apparatus broadly comprises an outer wall having an upper end and a lower end; a first wall arranged within and spaced from the outer wall, the first wall having an upper end and a lower end and defining an inner flow passageway therewithin; a second wall arranged within and spaced from the outer wall and having a lower end joining the first wall and forming with the first and outer walls an annular outer flow passageway; a plurality of inclined vanes joining the second and outer walls and arranged to induce an upward flow through the outer flow passageway to swirl; and fluid supply means arranged to maintain a level of fluid within the apparatus such that the vanes will remain submerged and for causing fluid flow upwardly through the outer passageway and downwardly through the inner passageway.

Accordingly, one object is to provide improved apparatus for forming a vortex.

Another object is to provide improved vortex-forming apparatus for use in an evaporator or a crystallizer.

Still another object is to provide improved vortex-forming apparatus having an annular trough into which solid material may settle and collect.

These and other like objects and advantages will become apparent from the foregoing and ongoing specification, the drawings, and the appended claims.

DESCRIPTION OF THE PREFERRED EMBODIMENTS

Figure 1:
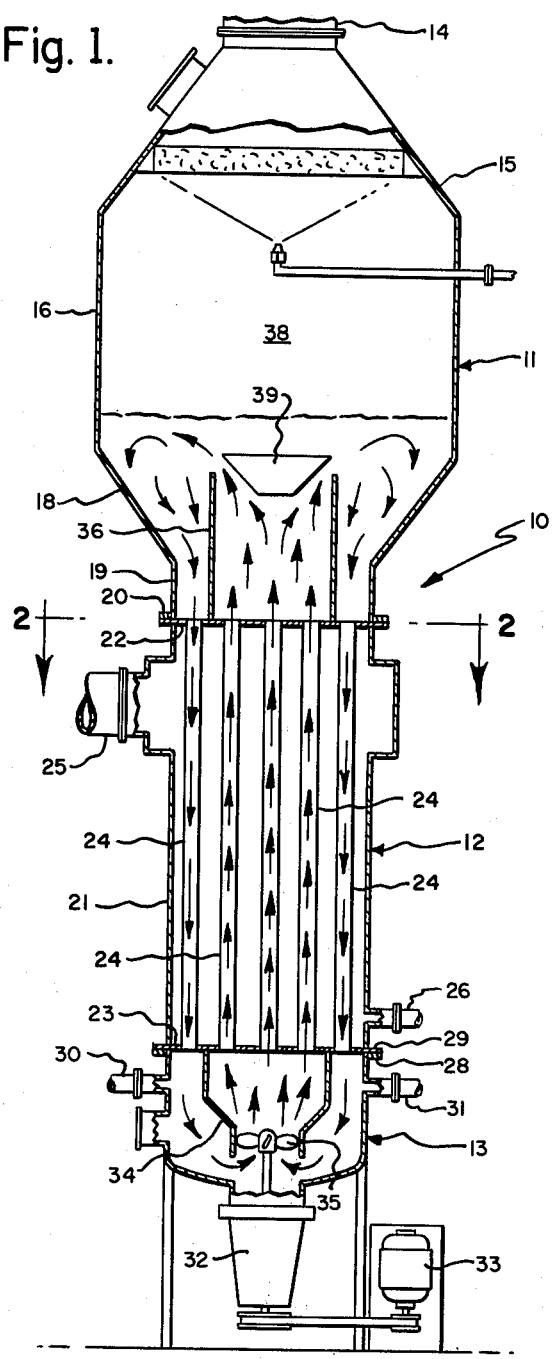
FIG. 1 is a fragmentary schematic vertical sectional view of a prior art forced-circulation evaporator.

At the outset, it should be clearly understood that like reference numerals are intended to identify the same elements and/or structure consistently throughout the several drawing figures, as such elements and/or structure may be further described or explained by the entire written specification of which this detailed description is an integral part.

The invention broadly provides improved apparatus for creating or forming a vortex. Such apparatus has a wide range of possible application, including use in evaporators, cooling crystallizers, vacuum crystallizers, and the like.

Figure 2:
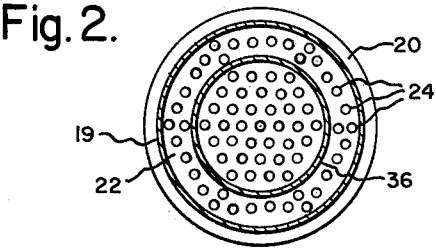
FIG. 2 is a fragmentary transverse horizontal sectional view thereof, taken generally on line 2—2 of FIG. 1.
Figure 4:
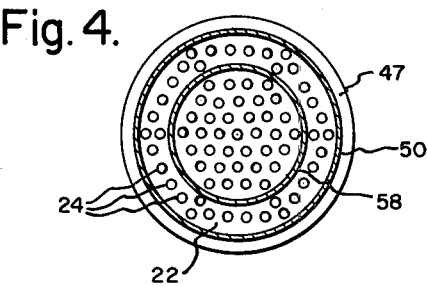
FIG. 4 is a fragmentary transverse horizontal sectional view thereof, taken generally on line 4—4 of FIG. 3.

Prior Art (FIGS. 1 and 2)

FIG. 1 schematically depicts a known type of forced-circulation evaporator, generally indicated at 10, which is commonly employed to increase the concentration of a fluid component. Such evaporators have also been used to crystallize such component, and deficiencies experienced in the operation of prior art evaporators have lead to the development of the present invention.

In FIG. 1, this known form of evaporator is shown as including an uppermost vapor body 11, an intermediate steamchest 12, and a lowermost circulation body 13 having a circulation chamber therewithin. The vapor body is shown as having an uppermost vapor outlet opening 14, and an enclosing side wall structure including a downwardly-divergent frusto-conical upper wall portion 15, a next lower intermediate cylindrical wall portion 16, a downwardly-convergent frusto-conical lower wall portion 18 continuing downwardly therefrom, and a cylindrical wall portion 19 terminating in a lowermost out-turned annular flange 20.

The steamchest 12 is shown as contained within a substantially-cylindrical enclosing wall 21, and is provided with plates 22, 23 closing its upper and lower ends. As best shown in FIG. 2, a plurality of vertical tubes, severally indicated at 24, are arranged within the steamchest and penetrate end plates 23, 24 so as to permit flow through the steamchest between the lower circulation chamber and the upper vapor body 11. At the same time, steam admitted to the steamchest through inlet 25, may flow around the various tubes, and exit via condensate outlet 26. Hence, steamchest 12 is arranged to permit heat transfer between fluid within tubes 24, and a heat-supplying medium flowing around the tubes. Obviously, the structure of this steamchest could be used in a cooling crystallizer by substituting an appropriate cooling fluid for steam.

The circulation body 13 is shown as being a cup-shaped element having an uppermost out-turned mounting flange 28 suitably connected to the lower mounting flange 29 of the steamchest. The circulating chamber has a fluid inlet 30 and a fluid outlet 31. The bottom of the circulating chamber is sealingly penetrated by the shaft of a circulating pump 32, driven by motor 33. A separation wall 34 is mounted on the steamchest lower end plate 23 and extends downwardly therefrom into the circlating chamber. This separation wall 34 functions to separate one central group of pipes 24 therewithin from another annular group between wall 34 and the outer steamchest wall. The impeller 35 of pump 32 is mounted on the upper end of the shaft. In use, impeller 35 is rotated in the appropriate direction to cause a flow of fluid upwardly through the central group of tubes 24, and downwardly through the annular group, these directions being indicated in FIG. 1.

A cylindrical tube 36, having a diameter substantially equal to that of separation wall 34, has its lower end suitably secured to the steamchest upper end plate 22, and extends upwardly therefrom into the chamber 38 within vapor body 11. A baffle 39 having a frusto-conical side wall, is arranged at the upper end of tube 36 so as to deflect the rising fluid flow laterally outwardly, again in the direction indicated by the arrows in FIG. 1.

In use, liquor is selectively admitted through inlet 30 to partially fill the vapor body. Motor 33 is then operated to rotate impeller 35 so as to cause an upward flow through the central steamchest tubes, and a downward flow through the outer tubes. Such prior art evaporator experienced a inherent design deficiency when operated to crystallize a fluid component. Such crystallization would normally occur proximate the walls of the vapor body. From time to time, chunks of the crystal cake would separate from the walls, and be carried downwardly toward the open mouths of the outer tubes. Frequently, such cake would obstruct the desired downflow through the outer tubes. This required frequent process interruption, during which the evaporator had to be flushed with a suitable dilutent to dissolve the obstruction.

The Apparatus (FIGS. 3-6)

Referring now to FIGS. 3-6, the invention provides improved apparatus, of which the presently preferred embodiment is generally indicated at 40, for forming a vortex. While the improvement possesses general utility, it finds particular application in a forced-circulation evaporator, a cooling crystallizer, or a vacuum crystallizer.

Figure 3:
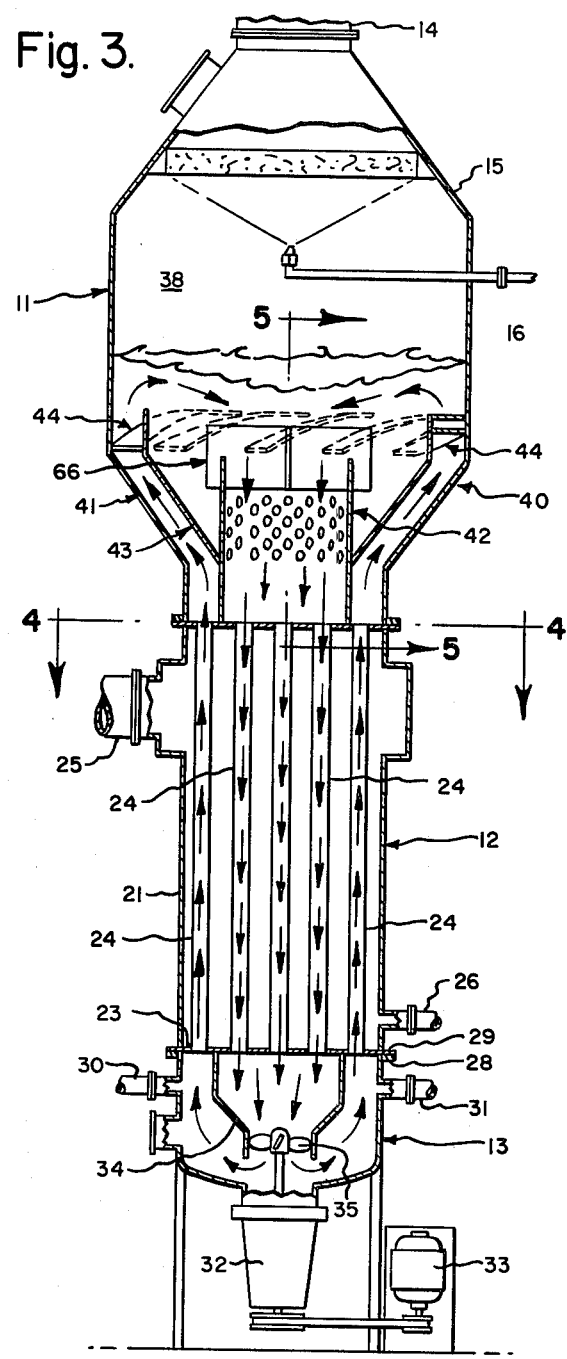
FIG. 3 is a fragmentary schematic vertical sectional view of an improved forced-circulation evaporator incorporating the vortex-forming apparatus.

In FIG. 3, the improved apparatus 40 is shown as being incorporated in a forced-circulation evaporator of the general type previously described. For convenience, the same reference numerals are used to identify the previously described structure of such evaporator.

Figure 5:
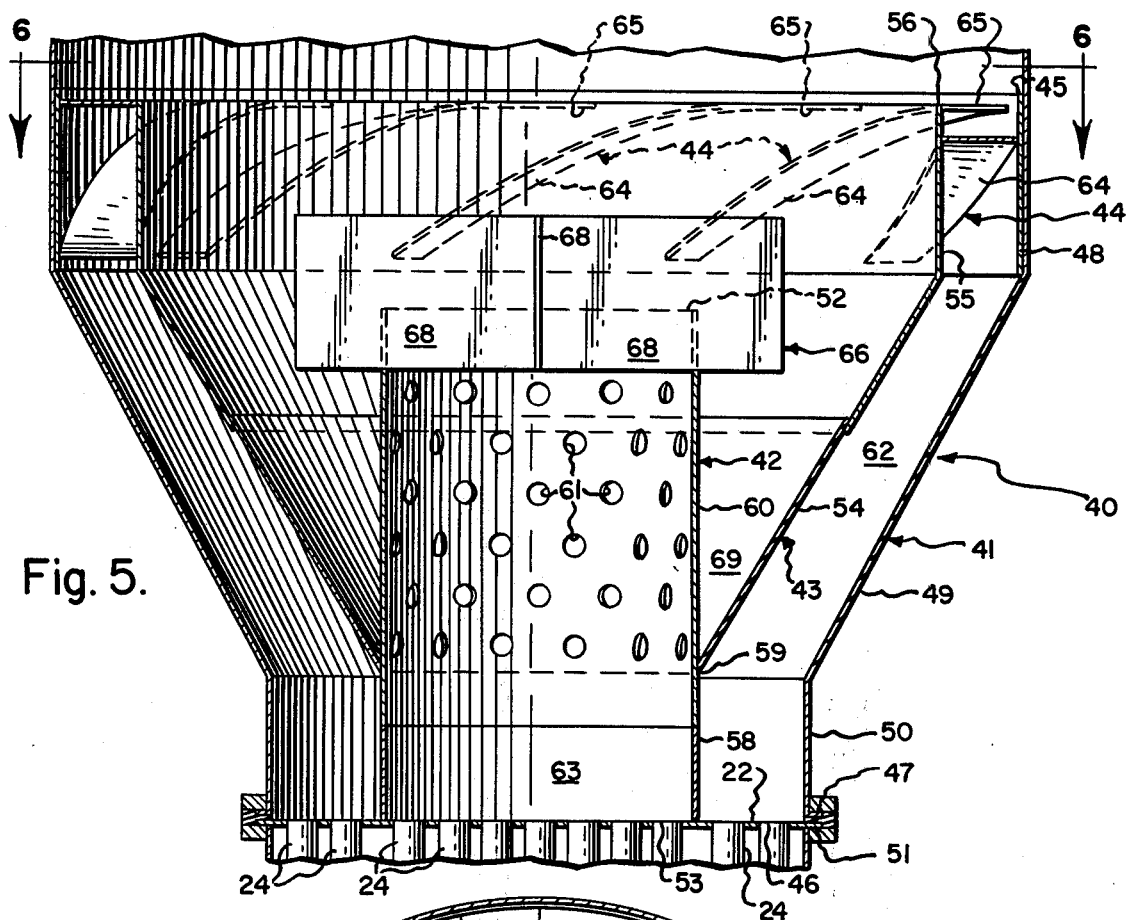
FIG. 5 is an enlarged fragmentary vertical sectional view thereof, taken generally on line 5—5 of FIG. 3, and principally showing the vortex-forming apparatus.
Figure 6:
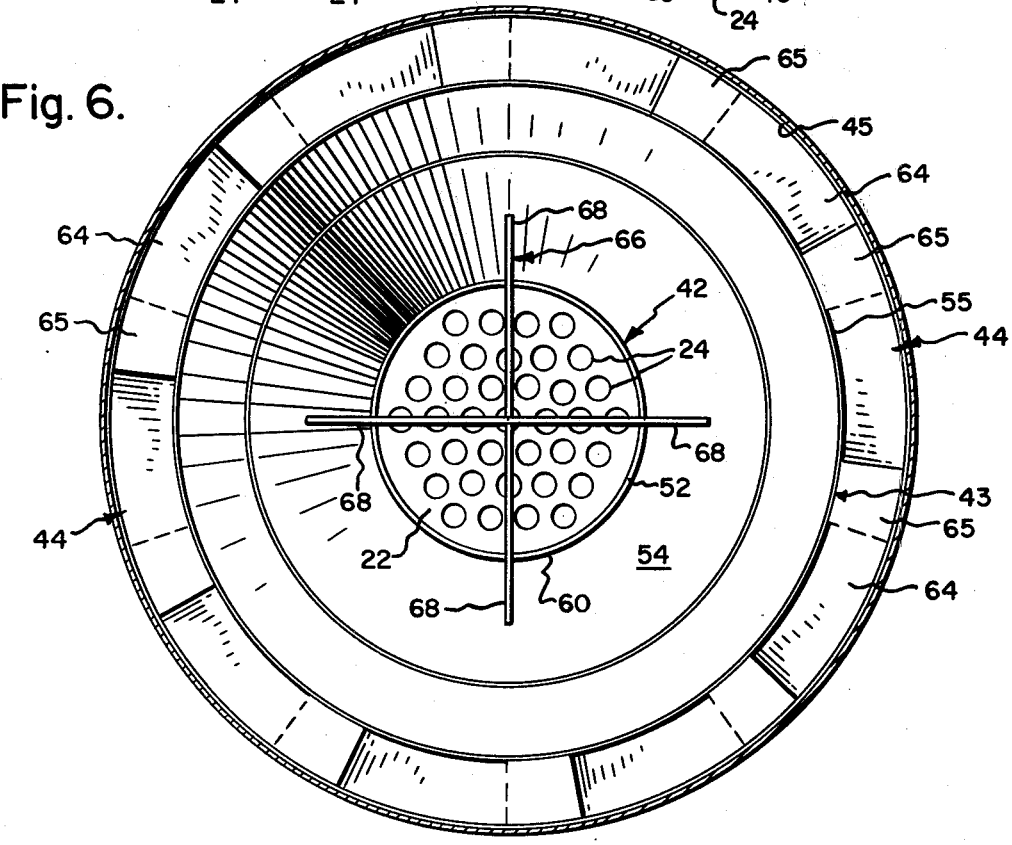
FIG. 6 is a fragmentary transverse horizontal sectional view thereof, taken generally on line 6—6 of FIG. 5, and showing the vortex-forming apparatus in top plan.

Referring now to FIGS. 5 and 6, the improved apparatus 40 is shown as including an outer wall 41, an inner first wall 42, an inner second wall 43, and a plurality of inclined vanes, severally indicated at 44.

In the preferred embodiment, portions of the vapor body outer wall form the outer wall 41, although this need not invariably obtain. If desired, the apparatus could be provided with a discrete outer wall which is not a part of or shared with any other physical structure. Adverting now to FIG. 4, the outer wall 41 is depicted as having an upper end 45 and a lower end 46. Specifically, the outer wall 41 includes a cylindrical wall portion 48 extending downwardly from upper end 45, a downwardly-convergent frusto-conical wall portion 49, and a cylindrical wall portion 50 continuing downwardly therefrom. Wall portion 50 is shown provided with an out-turned annular flange 47, which is adapted to abut a similar flange 51 provided on the upper end of the steamchest.

The first wall 42 is arranged within and spaced from the outer wall. In the preferred embodiment, the first wall is a cylindrical tube having an open upper end 52, and an open lower end 53 suitably secured to the upper end face 22 of the steamchest.

The second wall 43 is shown as having a lower downwardly-convergent frusto-conical portion 54 having its convergent end joining an intermediate portion of the first wall, and having an upper cylindrical portion 55 terminating in an uppermost end 56. The portion 58 of the first wall beneath the juncture of the second wall, is concentric with and spaced from the outer wall portion 50. Similarly, the second wall frusto-conical portion 54 is concentric with and spaced from outer wall frusto-conical portion 49. Second wall cylindrical portion 55 is concentric with and spaced from outer wall cylinder portion 48. Whereas the first wall portion 58 is solid beneath the annular juncture 59 of the second wall, the supplemental first wall portion 60 above this juncture is provided with a large plurality of relatively small perforations, severally indicated at 61, through which fluid may pass.

Thus, an annular outer flow passageway 62 is formed between facing wall surfaces 50 and 58, 49 and 54, and 48 and 55. When positioned atop the steamchest, the lower open end of this outer passageway communicates with the tubes 24 of the annular outer group. The first wall 42 defines an inner flow passageway 63 therewithin, which communicates with the tubes 24 of the inner group.

A plurality of vanes 44 are positioned within the upper portion of the outer passageway 62 between facing wall portions 48 and 55. There may be on the order of ten vanes spaced circumferentially from one another about the outer passageway. Each vane is shown as having an upwardly-inclined ramp segment 64, and an uppermost annular segment 65 continuing horizontally therefrom.

As best shown in FIGS. 5 and 6, a vortex breaker 66 is mounted on an upper marginal portion of the first wall to prevent the vortex from entering the inner passageway. This vortex breaker appears to have an X-shaped outline when viewed in top plan (FIG. 6), and coprisers four rectangular vertical plate-like members 68 radiating outwardly from a common center at ninety degree intervals.

The second wall portion 54 forms with the first wall upper portion 60, an upwardly-open annular trough 69, having a V-shaped cross-section (FIG. 5). This trough 69 is positioned about the open mouth of the inner passageway, and functions to receive and hold settling crystal cake which might otherwise clog the inner tubes of the first passageway.

Employment of the apparatus in an improved evaporator (FIG. 3), has a number of advantages over prior art evaporators (FIG. 1). In such known evaporators, solid crystallized material which separated from the walls of the vapor body would be carried downwardly by the circulation flow to readily clog the tubes of the outside annular group. With the present improvement, the flow pattern is varied such that such obstruction-causing crystal cake will be carried upwardly and away from the outer tubes. At the same time, the apparatus provides trough 69 into which such crystal may settle and collect, without clogging or otherwise obstructing the tubes of the steamchest. Hence, by employment of the improved apparatus, an evaporator may be operated for substantially longer periods before flushing with a dilutent is required.

Of course, various changes and modifications may be made. For example, the size and shape of the various parts may be readily varied to suit a particular design, for manufacturing or assembling convenience, or for other reasons. The outer wall of the apparatus may be common to other structure, or may be separately provided. The inventive apparatus broadly provides a means for forming a vortex, apart from the particular environment of use shown in the accompanying drawings. For example, such apparatus may be used with a forced-circulation evaporator (as shown), a cooling crystallizer, a vacuum crystallizer, or in connection with other types of apparatus.

Therefore, while the presently preferred embodiment of the apparatus has been shown and described, and several modifications thereof discussed, persons skilled in this art will readily appreciate that various additional changes and modifications may be made without departing from the spirit of the invention, as defined by the following claims.

What is claimed is:

1. Apparatus for forming a vortex, comprising:
   an outer wall having an upper end and a lower end;
   a first wall arranged within and spaced from said outer wall, said first wall having an upper end and a lower end and defining an inner flow passageway therewithin;
   a second wall arranged within and spaced from said outer wall, said second wall having a lower end joining said first wall and forming with said first and outer walls an annular outer flow passageway;
   a plurality of inclined vanes joining said second and outer walls and arranged to induce an upward flow through said outer flow passageway to swirl; and
   fluid supply means operatively arranged to maintain a level of fluid within said apparatus such that said vanes will be submerged and for causing a fluid flow upwardly through said outer passageway and downwardly through said inner passageway;
   thereby to create a vortex within said apparatus.

2. Apparatus as set forth in claim 1, and further comprising: a vortex breaker mounted on the upper end of said first wall.

3. Apparatus as set forth in claim 1 wherein said first wall is perforated above the point where said first wall is joined by said second wall.

4. Apparatus as set forth in claim 1 wherein said first and second walls form an upwardly-opening annular trough therebetween into which solid particles may settle.

5. Apparatus as set forth in claim 4 wherein said first wall is perforated above the point where said first wall is joined by said second wall.

6. Apparatus as set forth in claim 1 wherein said vanes are spaced from one another about the periphery of said first wall.

7. Apparatus as set forth in claim 1 wherein said outer wall has a frusto-conical portion and a cylindrical portion, wherein said second wall has a frusto-conical portion spaced from but arranged to face said outer wall frusto-conical portion and has a cylindrical portion spaced from but arranged to face said outer wall cylindrical portion, and wherein said vanes are provided between said cylindrical portions.

8. Apparatus as set forth in claim 1 wherein the said first and outer wall lower ends are mounted on a heat exchanger such that fluid will be supplied from said heat exchanger upwardly to said outer passageway, and may return downwardly through said inner passageway.

9. Apparatus as set forth in claim 1 wherein said outer wall upper end is connected to a vapor body.

* * * * *